United States Patent [19]
Bianchini, Jr. et al.

[11] Patent Number: 5,440,546
[45] Date of Patent: * Aug. 8, 1995

[54] PACKET SWITCH

[75] Inventors: Ronald P. Bianchini, Jr.; Hyong S. Kim, both of Pittsburgh, Pa.

[73] Assignee: Carnegie Mellon University, Pittsburgh, Pa.

[*] Notice: The portion of the term of this patent subsequent to Feb. 15, 2011 has been disclaimed.

[21] Appl. No.: 141,919

[22] Filed: Oct. 22, 1993

Related U.S. Application Data

[63] Continuation of Ser. No. 777,737, Oct. 16, 1991, Pat. No. 5,287,346.

[51] Int. Cl.$^6$ ............................................. H04Q 11/04
[52] U.S. Cl. ........................................ 370/60; 370/61; 370/60.1
[58] Field of Search ................... 370/60, 61, 94.1, 60.1

[56] References Cited

U.S. PATENT DOCUMENTS

| | | | |
|---|---|---|---|
| 4,512,011 | 4/1985 | Turner | 370/60 |
| 4,730,305 | 3/1988 | Acampora et al. | 370/60 |
| 4,813,038 | 3/1989 | Lee | 370/60 |
| 4,947,388 | 8/1990 | Kuwahara et al. | 370/60 |
| 5,287,346 | 2/1994 | Bianchini, Jr. et al. | 370/60 |

Primary Examiner—Douglas W. Olms
Assistant Examiner—Russell W. Blum
Attorney, Agent, or Firm—Reed Smith Shaw & McClay

[57] ABSTRACT

The present invention pertains to a packet switch. The packet switch is comprised of a global shared-memory queue having M storage addresses in which respective packets are stored, where $M \geq 3$ and is an integer. The packet switch is also comprised of a presentation network having N input ports for receiving packets and providing the respective packets to desired addresses in the queue, where $N \geq 3$ and is an integer. The queue is in communication with the presentation network for receiving the packets. The packet switch is also comprised of a distribution network having J input ports, where $J \geq 1$, for receiving packets from the queue and providing them to the desired output ports. The distribution network is in communication with the queue. There is also means for ordering packets received by the presentation network such that packets received sequentially by the presentation network are caused to be provided by the presentation network to consecutive addresses in the queue. In a preferred embodiment, $M = N = J$, the ordering means includes a fetch-and-add circuit in communication with the queue such that it identifies addresses free for storage of packets being received by the presentation switch, and causes the packets being received by the presentation network to be placed into consecutive addresses free for storage; and the presentation network and the distribution network are each a $\Omega$ switch. In an even more preferred embodiment, the packet switch has multicast capability.

15 Claims, 17 Drawing Sheets

PACKET SWITCH

This is a continuation of copending application(s) Ser. No. 07/777,737 filed on Oct. 16, 1991, now U.S. Pat. No. 5,287,346.

FIELD OF THE INVENTION

The present invention is related to switching systems. More specifically, the present invention is related to a switching system having a global shared memory queue.

BACKGROUND OF THE INVENTION

ATM (Asynchronous Transfer Mode) is the recommended transport technique for BISDN (Broadband Integrated Services Digital Network) to carry various traffics, such as video, voice, and data, by CCITT, an international standard body. ATM provides a flexible bandwidth, fast and dynamic reconfiguration of calls, service independency, and efficient multiplexing of bursty traffics. An ideal ATM switch is able to accommodate bursty traffic arising from various heterogeneous BISDN services without incurring intolerable delay and high hardware complexity.

Buffers are required in the packet switch for the temporary storage of transmitted packets. Buffering is primarily required for external and internal resource conflicts. An example of an external resource conflict occurs when two packets are to be transmitted on the same output port. In this case, typically one packet is transmitted and one is buffered. Internal conflicts occur when two packets require the same internal source, e.g. a wire internal to the switch.

Current switch designs incorporate either discrete input buffers, discrete output buffers, or internal buffering [M. G. Hluchy; and M. J. Karol, "Queuing in High-Performance Packet Switching" *IEEE Journal on Selected Areas in Communications* SAC-6, pp. 1587-1597, Dec. 1988]. For discrete input buffers, a queue is associated with each input port. Arriving packets are inserted at the bottom of the queue. The top packet is removed if no internal or external conflicts arise with other packets in he switch. Output buffering associates a similar queue with each output port. Internal buffering associates discrete buffers with internal switch structures, or stages. Results from previous studies (K. Lutz, "Considerations on ATM switching techniques," *International Journal of Digital and Analog Cabled Systems*, vol. 1, pp. 237-243, 1988; A. Eckberg and T. Hou, "Effects of output buffer sharing on buffer requirements in an ATDM packet switch," in *Proc. of INFOCOM '88*, (New Orleans, La.), IEEE, Mar. 1988, pp. 459-466; H. Kim and A. Leon-Garcia, "A multistage ATM switch with interstage buffers," *International Journal of Digital & Analog Cabled Systems*, vol. 2, pp. 289-301, Dec. 1989; H. Kim and A. Leon-Garcia, "Comparative performance study of ATM switches," in preparation for the Proceedings of the IEEE, 1990) indicate that sharing a common buffer lowers the packet loss probability of the switch dramatically. The improvement is expected to be even greater for bursty traffics.

The size and number of buffers utilized in the packet switch can have significant effects on its cost and performance. Large and high numbers of buffers have detrimental effects on complexity and cost. In addition, large buffers can significantly increase the delay required to transmit a packet from the switch. Small, discrete buffers can result in dropped packets due to buffer overflow. It is desirable to require buffers of small size, whose numbers grow linearly with the number of switch inputs or outputs.

Output buffering switches have the best performance in terms of throughput and packet delay under uniform traffic patterns. However, their high hardware complexity led to the study of input queuing switch structures which have lower hardware complexity (J. Hui and E. Arthurs, "A broadband packet switch for integrated transport," *IEEE Journal on Selected Areas in Communications*, vol. SAC-5, pp. 1264-1273, Oct. 1987.). In the present invention, a non-blocking input queuing switch architecture with a shared-memory input queue is presented. The simple shared-memory input queue allows the input ports to share a common buffer, thus absorbing bursty traffic without increased packet loss. Furthermore, the switch ensures that the packets are transmitted in the order that they are received, eliminating the resequencing problem at the end-user.

SUMMARY OF THE INVENTION

The present invention pertains to a packet switch. The packet switch is comprised of a global shared-memory queue having M storage addresses in which respective packets are stored, where $M \geq 3$ and is an integer. The packet switch is also comprised of a presentation network having N input ports for receiving packets and providing the respective packets to desired addresses in the queue, where $N \geq 3$ and is an integer. The queue is in communication with the presentation network for receiving the packets. The packet switch is also comprised of a distribution network having J input ports, where $J \geq 1$, for receiving packets from the queue and providing them to the desired output ports. The distribution network is in communication with the queue. There is also means for ordering packets received by the presentation network such that packets received sequentially by the presentation network are caused to be provided by the presentation network to consecutive addresses in the queue. In a preferred embodiment, $M = N = J$, the ordering means includes a fetch-and-add circuit in communication with the queue such that it identifies addresses free for storage of packets being received by the presentation switch, and causes the packets being received by the presentation network to be placed into consecutive addresses free for storage; and the presentation network and the distribution network are each an $\Omega$ switch.

In an even more preferred embodiment, the packet switch has multicast capability.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 5:
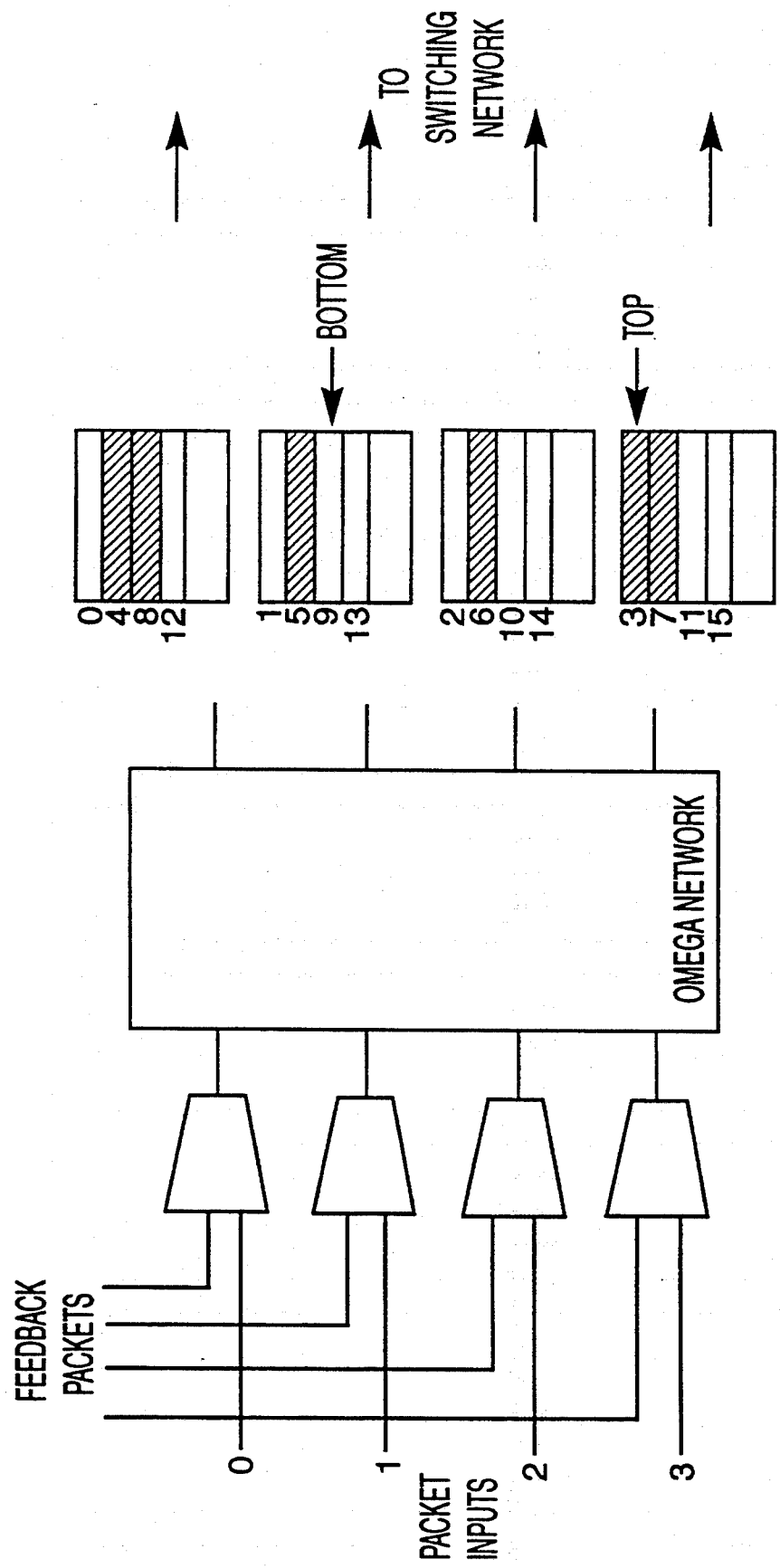
FIG. 5 is a schematic representation of a packet queue structure.
Figure 8:
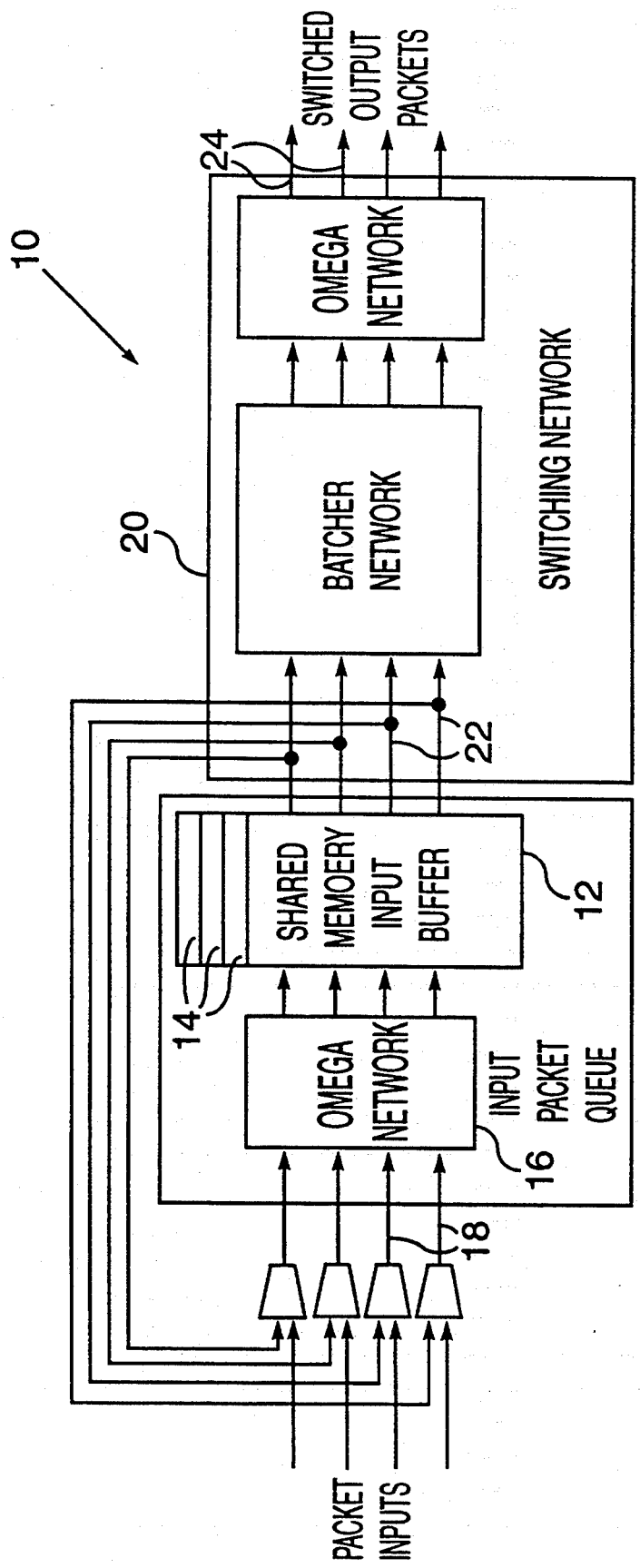
FIG. 8 is a schematic representation of a shared-memory switch architecture detail.

Referring now to the drawings wherein like reference numerals refer to similar or identical parts throughout the several views, and more specifically to FIG. 8 thereof, there is shown a schematic representation of a packet switch 10. The packet switch 10 is comprised of a global shared-memory queue 12 having M storage addresses 14 in which respective packets are stored, where $M \geq 3$ and is an integer. The queue 12 is preferably interleaved as shown in FIG. 5 and is a FIFO queue.

The packet switch 10 is also comprised of a presentation network 16 having N input ports 18 for receiving packets and providing the respective packets the desired addresses 14 in the queue 12, where $N \geq 3$ and is an integer. The queue 12 is in communication with the presentation network for receiving the packets. Additionally, the packet switch 10 is comprised of a distribution network 20 having J input ports 22, where $J \geq 3$, for receiving packets from the queue 12 and providing them to the desired output ports 24. The distribution network 20 is in communication with the queue 12. Preferably, the presentation network 16 is an Omega switch. The distribution network 20 is preferably also an Omega switch but is not limited thereto. The presentation network 16 preferably is comprised of $LOG_2 N$ stages.

Figure 6:
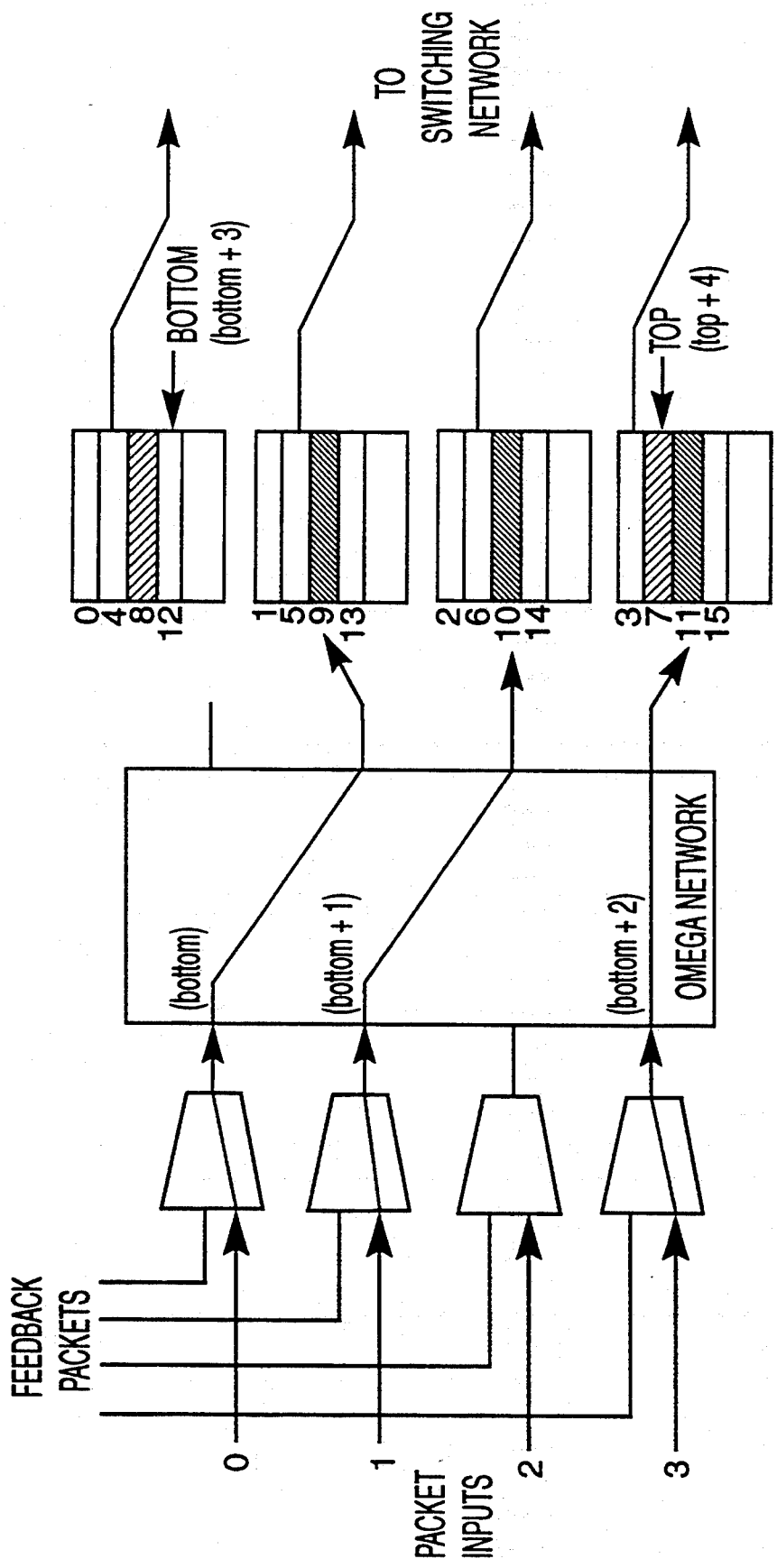
FIG. 6 is a schematic representation of a packet queue phase I operation.

Moreover, the packet switch 10 is comprised of means for ordering packets received by the presentation network 16 such that packets received sequentially by the presentation network are caused to be provided by the presentation network 16 to consecutive addresses 14 in the queue 12. Preferably, $M=N=J$, and preferably, the ordering means includes a fetch-and-add circuit in communication with the queue 12 such that it identifies addresses 14 in paralled free for storage of packets being received by the presentation network 16, and causes the packets being received by the presentation network 16 to be placed in consecutive addresses 14 free for storage as shown in FIG. 6.

In the operation of the preferred embodiment, a switch of size N×N (N input, N output) is assumed with a non-blocking distribution network. Packets are assumed to be of a constant length; these "packets" are called "cells" in an ATM environment. ATM specifies fixed-length packets comprising 5 bytes (octets in the ATM terminology) for the header and 48 octets for the information payload. It is also assumed that all input links to the network are slotted and synchronized with bit rates equal to 155 Mbps (or even higher bit rates, e.g. 600 Mbps). The resulting packet slot time is approximately 2.8 $\mu$sec. Thus, the switch fabric has to be designed in such a way so that it can handle approximately 350,000 packets per second per input port.

Figure 1:
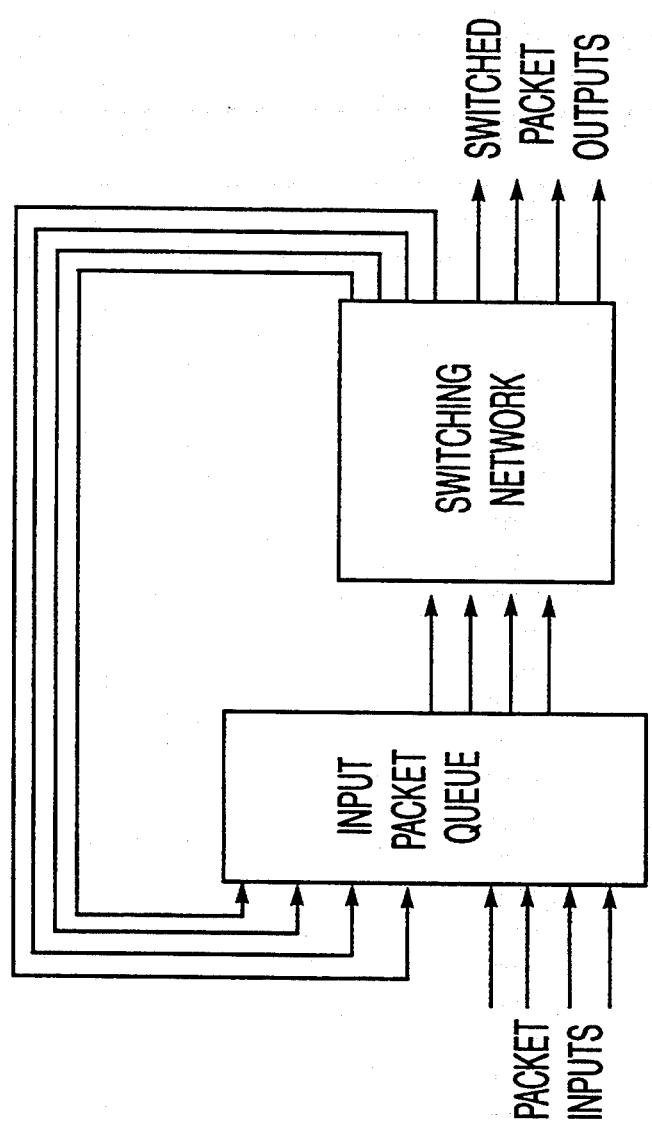
FIG. 1 is a schematic representation of a shared-memory switch architecture.

The switch architecture is illustrated in FIG. 1. The architecture consists of a shared-memory input queue and a switching network. Packets can arrive on N input ports. The switching network sorts the packets according to the output port required for each packet. At most one packet is routed to each output port. Additional packets for each output port are returned to the input queue for subsequent transmission. The shared-memory input queue stores packets to be routed in the switching network. Access to the shared-memory occurs in FIFO fashion to maintain packet order.

Any non-blocking input-queuing switch (J. Hui and E. Arthurs, "A broadband packet switch for integrated transport," *IEEE Journal on Selected Areas in Communications*, vol. SAC-5, pp. 264-1273, Oct. 1987.; B. Bingham and H. Bussey, "Reservation-based contention resolution mechanism for Batcher-Banyan packet switches," Electronics Letters, 23rd, vol. 24, pp. 772-773, June 1988; J. Degan, G. Luderer, and A. Vaidya, "Fast packet technology for future switches," *AT&T Technical Journal*, vol. 68, pp. 36-51, March/April 1989) can be used in the switch architecture. The Batcher-Banyan network is selected as the switching network. The Batcher-Banyan network consists of a Batcher sorter (K. Batcher, "Sorting networks and their applications," in *AFIPS Proc. of Sprint Joint Comput. Conf.*, 1968, pp. 307-314) followed by a Banyan network. The Banyan network is non-blocking when packets at the input ports are sorted according to their destination addresses and placed in the input ports consecutively. Thus, packets sorted by the Batcher sorter proceed through the Banyan network without blocking. However, blocking may still occur if two packets have the same destination addresses. Packets with the same destination address will end up next to each other after being sorted in the Batcher network. The destination addresses of packets at the input port will not be in ascending or descending order. Therefore, some arbitration scheme is needed to send only one packet of all packets with same destination addresses. Hui and Arthurs (J. Hui and E. Arthurs, "A broadband packet switch for integrated transport," *IEEE Journal on Selected Areas in Communications*, vol. SAC-5, pp. 1264-1273, Oct. 1987) proposed a Batcher-Banyan switch architecture with a three phase algorithm to send only one packet to each output port. The three phase algorithm is used to resolve output port contention without adding extra hardware. The three phase algorithm first finds input packets with the same destination addresses and then selects one packet for each destination port. Thus, selected packets will have all distinct destination addresses. In Hui's switch, the packets that are not chosen during a selection procedure are placed in dedicated-memories. However, in the present switch architecture, these packets are fed back into the shared-memory input queue through an Omega network. The details of the operation of the shared-memory input queue are described below.

Figure 2B:
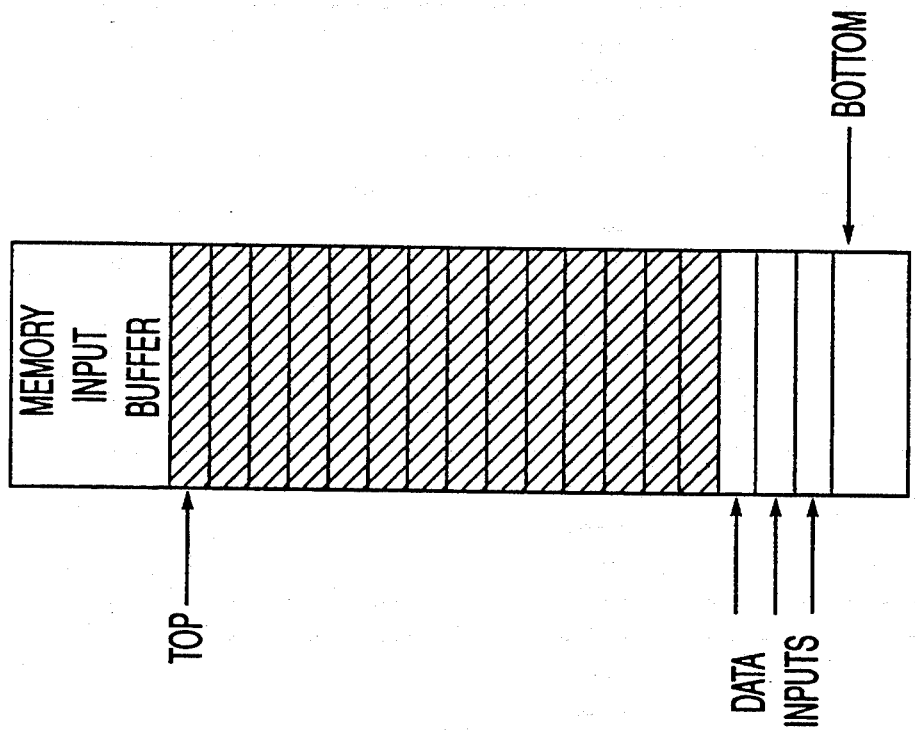
FIG. 2 is a schematic representation of a packet queue operation.
Figure 2A:
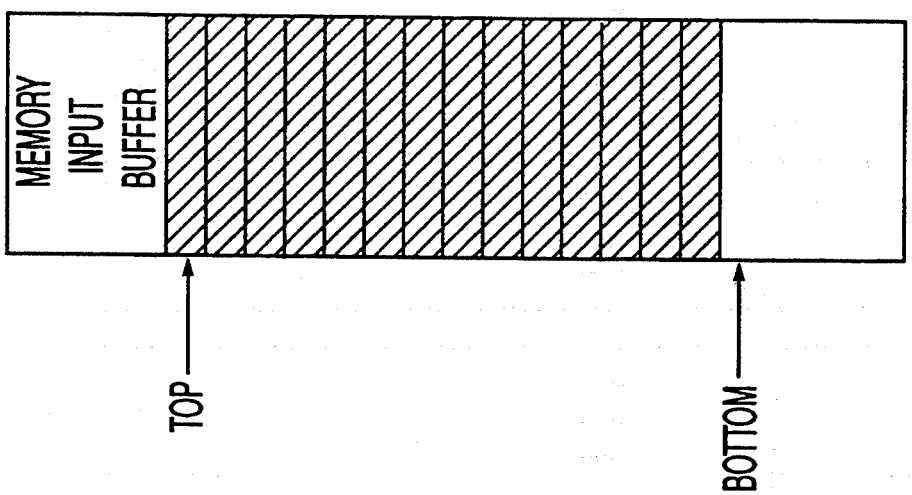
Figure 3B:
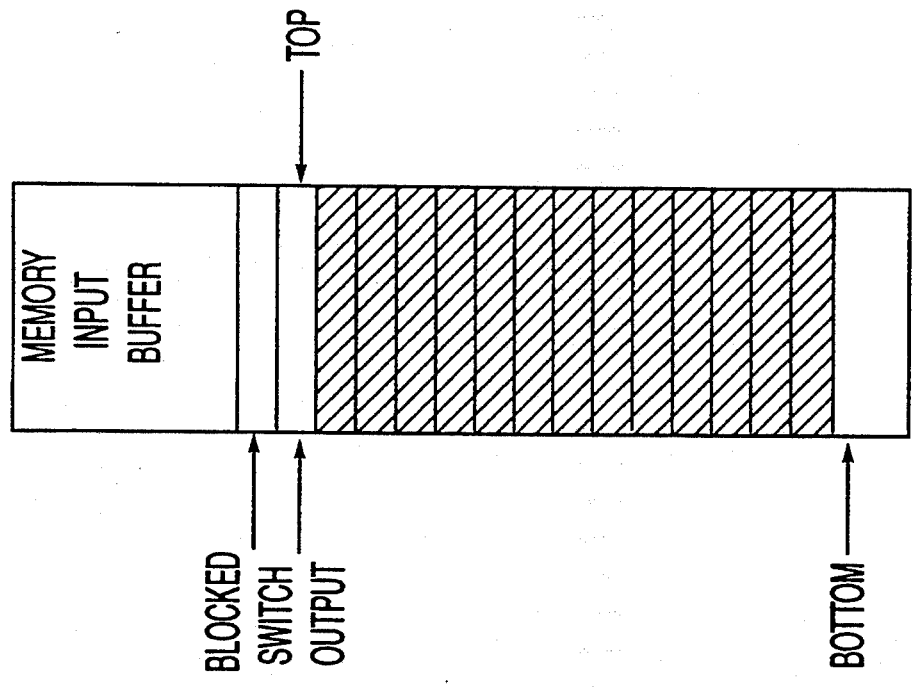
FIG. 3 is a schematic representation of a packet queue operation.
Figure 3A:
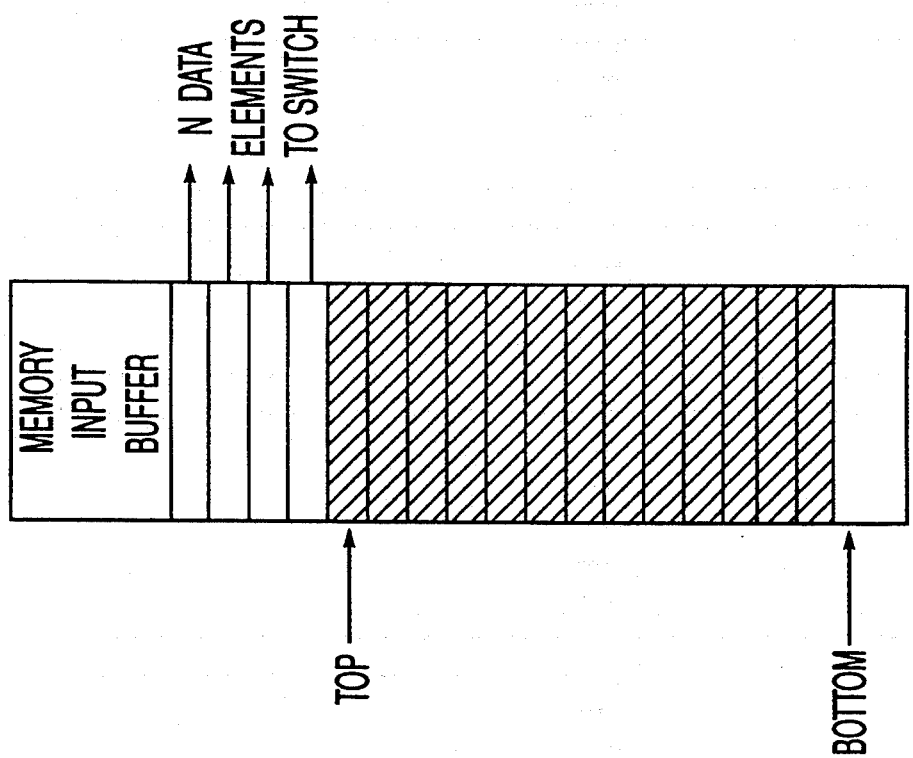

This section concerns the design of the shared-memory input queue. The specification of the input queue is illustrated in FIG. 2a. The queue consists of a shared-memory and two memory pointers. Pointers Top and Bottom, contain the addresses of the oldest packet in the memory and the next available element in the queue, respectively. The queue must facilitate the simultaneous input of up to N input packets, the simultaneous output of up to N packets to the switching network and the simultaneous feedback of up to N−1 blocked packets from the switching network. In FIG. 2b, P=3 input packets are inserted at the queue bottom and bottom pointer is subsequently incremented by P. In FIG. 3a the N oldest packets in the queue are removed from the queue to be routed in the switching network. The top pointer is incremented by N. In FIG. 3b, F=2 packets are returned to the input queue due to blocking at output ports. To maintain the input packet order, the returned packets must be added to the top of the queue. Top pointer is subsequently decremented by F.

As illustrated above, the specification of the input packet queue consists of three functional requirements:

Input Packets: Packets arrive on P≦N input ports and are appended to the bottom of the input queue. The following two functions must be performed:
1. Address Generation: A unique address must be generated for each input packet in the shared-memory. Addresses must be unique and sequential from bottom to bottom +P. The bottom pointer is updated to bottom +P.
2. Packet Queuing: All input packets must be simultaneously stored in the shared-memory.

Output Packets: The top N packets are simultaneously removed from the input queue. The top pointer is updated to top +N. Address generation for output packets is implicit and can be determined utilizing the top memory pointer.

Feedback Packets: Feedback packets arrive on F<N channels and are appended to the top of the input queue. As with input packets, the following two functions must be performed:
1. Address Generation: A unique address must be generated for each feedback packet in the shared-memory. Addresses must be unique and sequential from top - F to top. The top pointer is updated to top - F.
2. Packet Queuing: All feedback packets must be simultaneously stored in the shared-memory.

The design of the memory buffer and its interface is presented according to input and output functional specifications. A key requirement of the queue design is that queue elements are stored sequentially in memory without null space between packets. This requirement forces the feedback of blocked output packets that must be re-inserted at sequential addresses at the top of the queue. Sequential storage of queue elements will be crucial to both storage capacity and performance issues, including throughput.

To facilitate simultaneous output of N packets, the memory is interleaved into N memory banks. Each memory bank is connected to a port of the switching network. Due to memory interleaving, any N sequential addresses in memory are located in unique memory banks, and can be accessed simultaneously by the switching network. Thus, simultaneous output to the switching network is guaranteed.

Simultaneous input of up to N input packets must be performed by the input queue. Queue input requires two steps, address generation and packet queuing. Each packet requiring input to the queue must receive a unique address in the shared-memory. In addition, addresses must be sequential to guarantee proper queue structure. After address generation, simultaneous access of the queue is required for packet storage. Simultaneous access can be provided by an Omega switching network. It is proven in (H. Kim and A. Leon-Garcia, "Non-blocking property of reverse banyan network," accepted for publication in the IEEE trans. on Communications, May 1989) that simultaneous access is provided in an Omega network if the inputs are ordered (sequential) and the outputs are sequential (ordered). Since the queue is sequential simultaneous access can occur if address generation provides ordered addresses to the inputs. An address generation scheme is required to generate proper addresses at the input ports.

A scheme for address generation is given in (G. Almasi and A. Gottlieb, Highly Parallel Computing. Redwood City, Calif.: The Benjamin/Cummings Publishing Company, Inc., 1989) that permits simultaneous generation of unique, sequential addresses. The scheme utilizes a fetch-and-add memory operation. The fetch-and-add operation occurs in a single memory cycle and reads a memory location and simultaneously stores the previous value plus an offset to the same location. A fetch-and-add of 3, written fetch-and-add (3), on a memory location that contains value 9 returns 9 and writes 12 (9+3) to the memory. The fetch-and-add operation can be utilized to generate unique addresses in a sequential fashion. Consider three input ports that require the addresses of the next available elements in the queue memory. These addresses can be determined by the ports executing sequential fetch-and-add (1) on the bottom pointer. Although this procedure provides correct operation, address generation is sequential and thus is a bottleneck.

Figure 4:
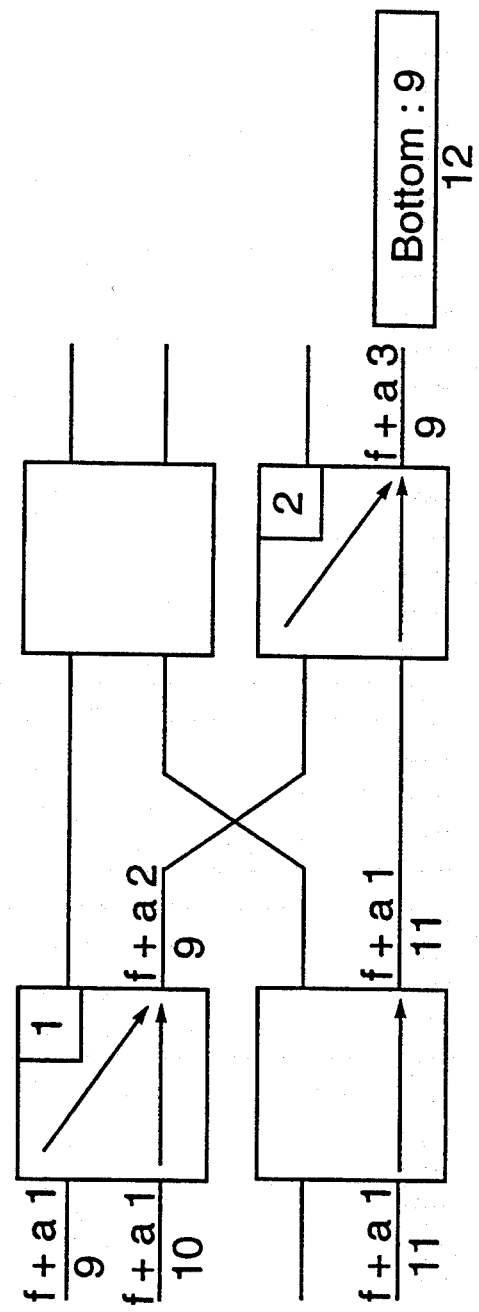
FIG. 4 is a schematic representation of an example combining fetch-and-add operation.

Simultaneous fetch-and-add access of a memory location is provided in (A. Gottlieb, R. Grishman, C. Kruskal, K. McAuliffe, L. Rudolph, and M. Snir, "The nyu ultracomputer—designing an mimd shared memory parallel computer," IEEE Trans. on Computer, pp. 175–189, February 1983) by combining fetch-and-add operations at each stage of an Omega network. Examine FIG. 4. Ports 0, 1 and 3 attempt simultaneous fetch-and-add (1) operations on the bottom pointer. The upper-left of the Omega network switch combines the fetch-and-add operations into a fetch-and-add (2) and records a 1, corresponding to the upper-most fetch-and-add input. Combining occurs at the lower right switch, resulting in a fetch-and-add (3) operation and records the 2 input of the upper most input. As a result of the fetch-and-add operation, three is added to the bottom pointer and 9 is returned to the lower right switch. The switch decomposes the fetch-and-add (3) by returning 9 on its upper return path and adding 9 to its stored 2 and returning 11 on its lower return path. The same decomposition occurs at the upper left switch, resulting in simultaneous generation of ordered addresses at ports 0, 1 and 3. Order is maintained at the inputs since the lower address is always returned to the lower input port address. A formal specification of the combining fetch-and-add operation is given in (A. Gottlieb, R. Grishman, C.

Kruskal, K. McAuliffe, L. Rudolph, and M. Snir, "The nyu ultracomputer—designing an mimd shared memory parallel computer," IEEE Trans. on Computer, pp. 175-189, February 1983) and design of a combining switch component is given in (S. Dickey, R. Kenner, M. Snir, and J. Solworth, "A vlsi combining network for the nyu ultracomputer," in *Proc. of IEEE International Conference on Computer Design,* IEEE, Oct. 1985).

Input and feedback packets are inserted in the memory buffer using simultaneous fetch-and-add address generation and then simultaneous memory access. Input packet addresses are generated by accessing the bottom pointer with fetch-and-add (1) at each input port receiving a packet. Feedback packet addresses are generated by accessing the top pointer with fetch-and-add (−1) at each feedback port receiving a packet. Simultaneous access of the memory in the Omega network is guaranteed due to packets arriving on ordered inputs sent to sequential outputs.

Two passes through the Omega network are required for feedback packets due to potential address wrapping. As shown in (H. Kim and A. Leon-Garcia, "Non-blocking property of reverse banyan network," accepted for publication in the IEEE trans. on Communications, March 1991, incorporated by reference), the Omega network is non-blocking for traffic with consecutive outputs and ordered inputs that do not wrap from the bottom input port to the top port. Since the top pointer can point to an arbitrary memory bank, wrapping is possible on the input of the feedback path. To alleviate this problem, the feedback packets are transmitted in two passes. The first includes the non-wrapped inputs from the top pointer to the bottom port. The second pass includes the wrapped inputs from the top port to the top pointer −1.

FIG. 5 identifies the critical structures of the packet queue. The queue consists of a shared, interleaved memory consisting of N interleaved banks. Each memory bank is connected to a single input port of the switching network and a single output port of an Omega network. The N inputs of the Omega network are time multiplexed between the input ports and the feedback ports, as illustrated with 2:1 multiplexors. Alternate multiplexing schemes are possible with the Omega network duplicated for each set of inputs.

A switching cycle is presented to illustrate the operation of the packet queue. The queue is required to input up to N input packets and up to N−1 feedback packets and output up to N packets to the switching network. The critical delay path is the routing of queue output packets through the switching network and returning blocked packets to the feedback inputs. To facilitate high throughput, input packets arrive concurrently with the propagation of output packets through the switching network. For discussion purposes, the switching cycle is illustrated by two timing phases. Phase one operation includes input packets and switching network propagation, and phase two operation includes feedback path packets.

Before phase one operation, the queue memory contains packets at locations 3 through 8 as shown in FIG. 5. The top 4 packets are removed from the queue and forwarded through the switching network. As shown in FIG. 6, the top pointer is incremented by 4 to 7 and identifies the next oldest packet in the queue. Input packets are received through the Omega network concurrently. In FIG. 6, packets are received at input ports 0, 1 and 3. The ports each execute fetch-and-add (1) on the bottom pointer to simultaneously generate addresses in the packet queue. The bottom pointer is incremented by 3 from 9 to 12. The ports receive addresses 9, 10 and 11 that are guaranteed to be sequential at the ordered inputs. Thus all input packets can be simultaneously transmitted through the Omega network. Due to the larger delay of the Batcher network, the inputs can be stored before feedback packets arrive.

Figure 7:
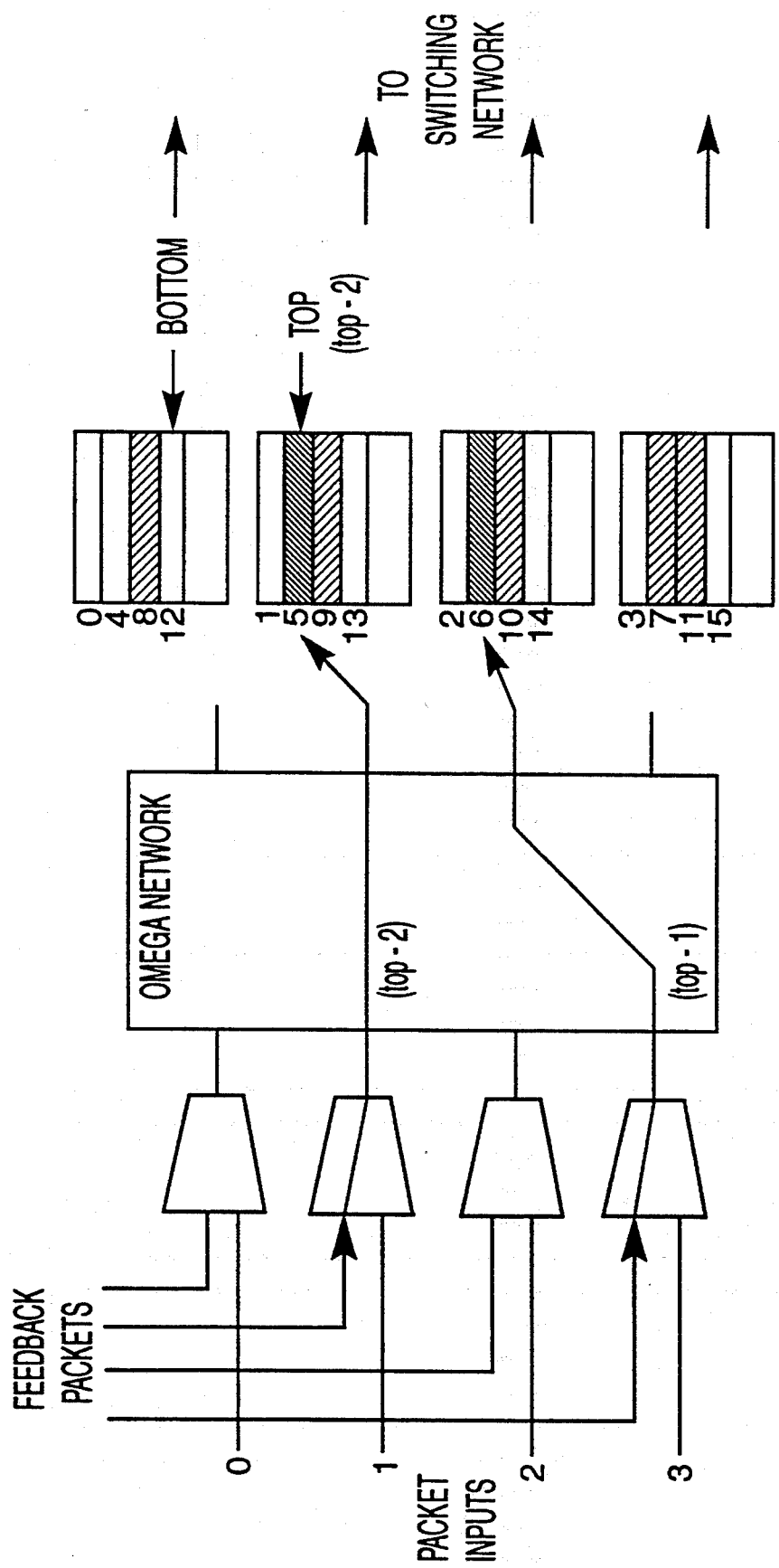
FIG. 7 is a schematic representation of a packet queue phase II operation.

Phase two operation begins after the Batcher network determines blocking packets and identifies the packets to be returned to the packet queue. Blocked packets are returned from memory banks 1 and 3 in FIG. 7. The feedback packets return on ports 1 and 3 of the Omega network and execute fetch-and-add (−1) on the top pointer simultaneously. The top pointer is decremented by 2 from 7 to 5. The ports receive addresses 5 and 6 and as before, can simultaneously access the packet queue. At cycle completion, three packets are added to the packet queue, two packets are successfully transmitted and the queue memory contains packets at locations 5 through 15. The final non-multicast switch architecture is given in FIG. 8.

Figure 9:
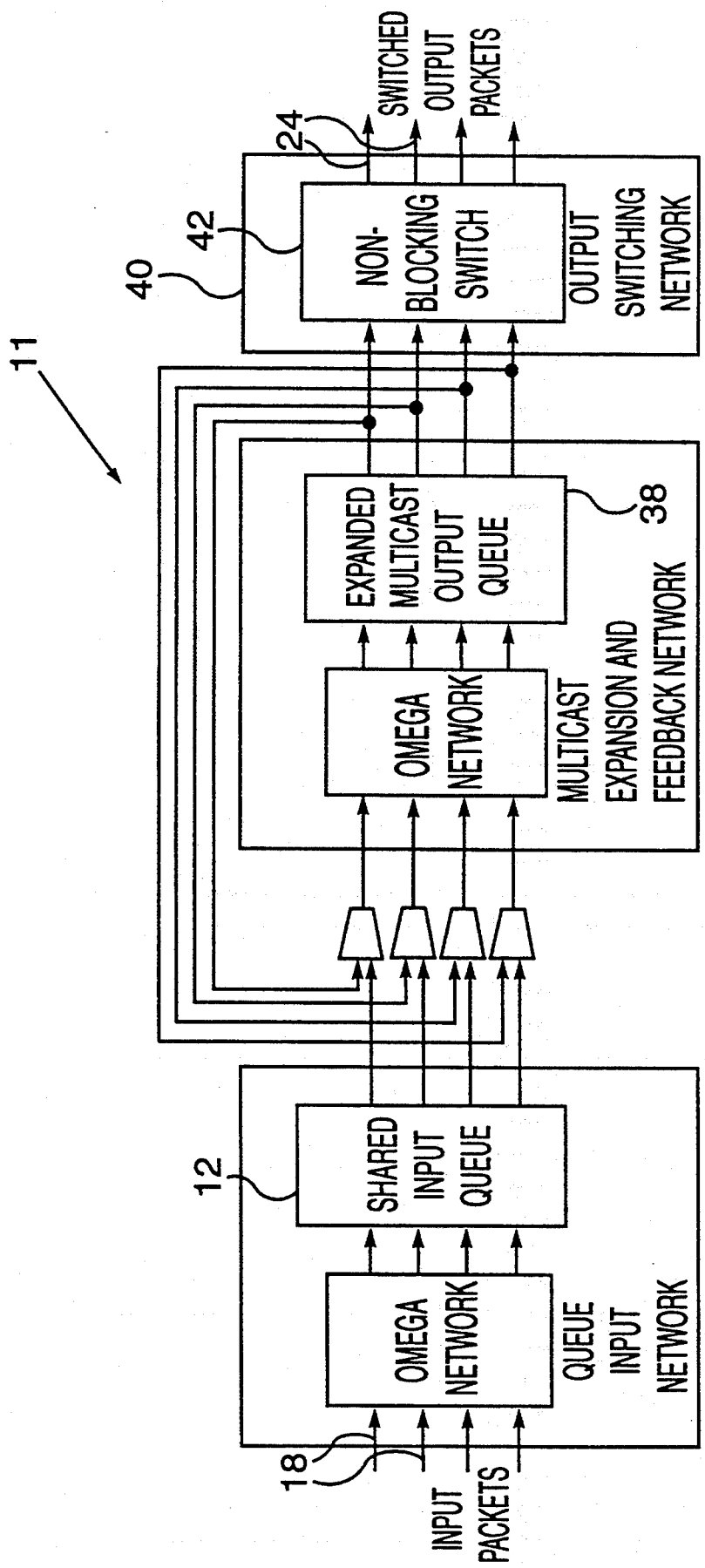
FIG. 9 is a schematic representation of a shared-memory copy network architecture.

The architecture of a shared-memory copy network for multicast is shown in FIG. 9. The architecture is comprised of two switching networks and two shared-memory queues. The first shared-memory contains a queue 12 of all input packets. The second shared-memory contains a queue 38 of all replicated packets. The switching networks preferably are comprised of two Omega networks. The Omega networks transfer packets between the respective input ports and the two shared memories. An output network 40 transfers packets from the multicast output queue 38 to the output ports 24 and can be either blocking or non-blocking. A typical input packet arrives at an input port 18, is stored in the shared-memory input queue 12, transferred to the shared-memory multicast output queue 38, and then switched out through a non-blocking switch 42. An input packet to be multicast is first stored in the shared memory input queue 12. A single multicast packet in the input queue 12 then replicated, once for each multicast output, and each copy is transferred to the multicast output queue 38. The replicated packets obtain the proper destination address through a table-lookup from an address translator and are then sent to the output network according to their destination addresses.

Figure 10:
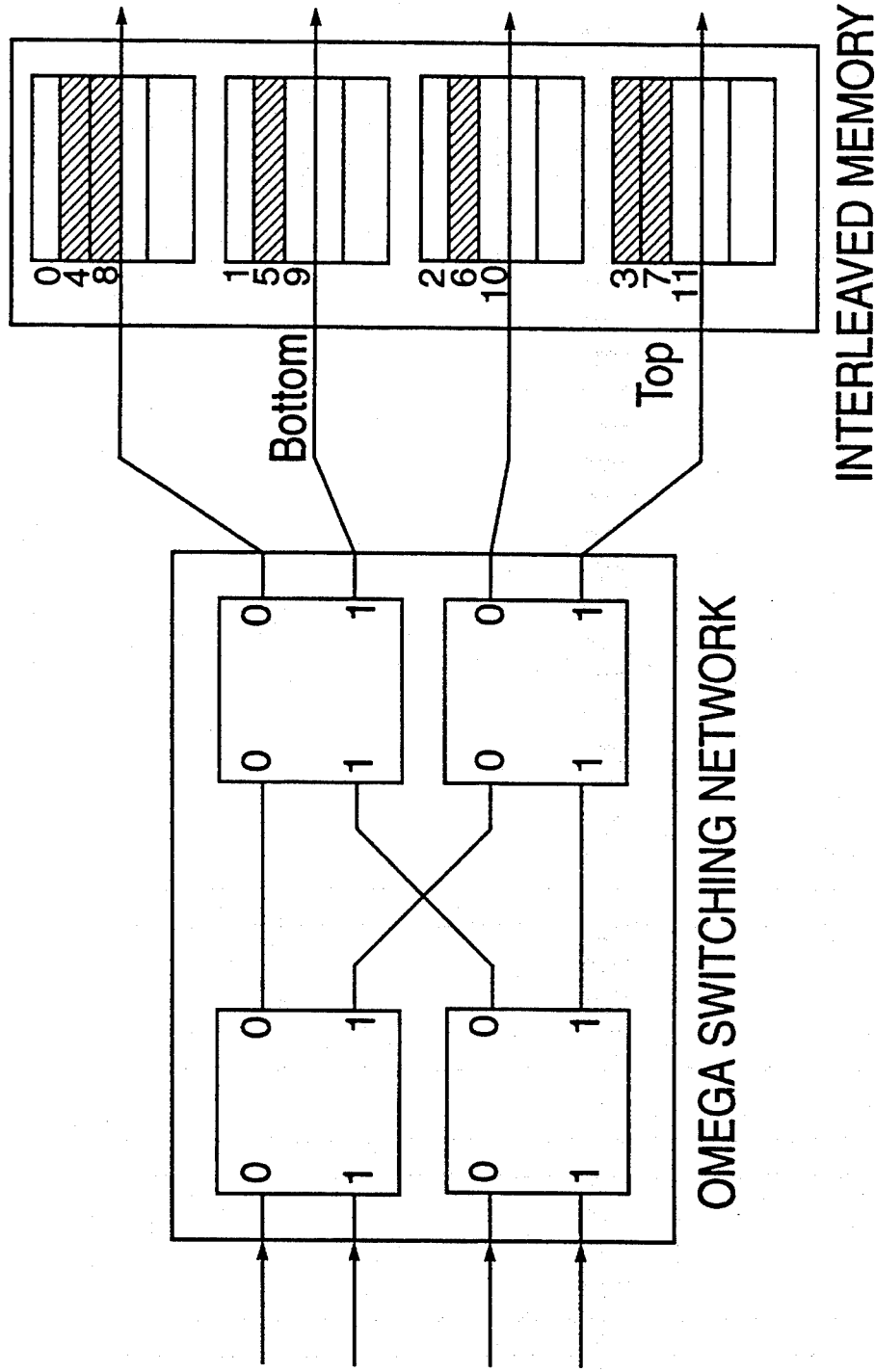
FIG. 10 is a schematic representation of a packet queue structure.

The Omega networks have O(Nlog$_2$N) switching elements. The output network 40 can be any non-blocking switching network such as a crossbar or the Batcher-Banyan switch (J. Hui and E. Arthurs, "A broadband packet switch for integrated transport," *IEEE Journal on Selected Areas in Communications,* vol. SAC-5, pp. 1264-1273, Oct. 1987) or blocking switching network such as an Omega network. If a blocking output network is used, additional packets feedback to the multicast queue due to internal blocking. Each queue is comprised of a shared, interleaved memory consisting of N interleaved addresses in which packets are stored. Each memory address is connected to a single input and output port of a switching network. The queue structures are implemented in memories with top and bottom pointers. Since memories are interleaved in N ways, any N sequential queue elements are located in unique and consecutive memory addresses as shown in FIG. 10. This feature is exploited to multicast packets without blocking. FIG. 10 identifies the critical structures of the switch and how they are connected.

Figure 11:
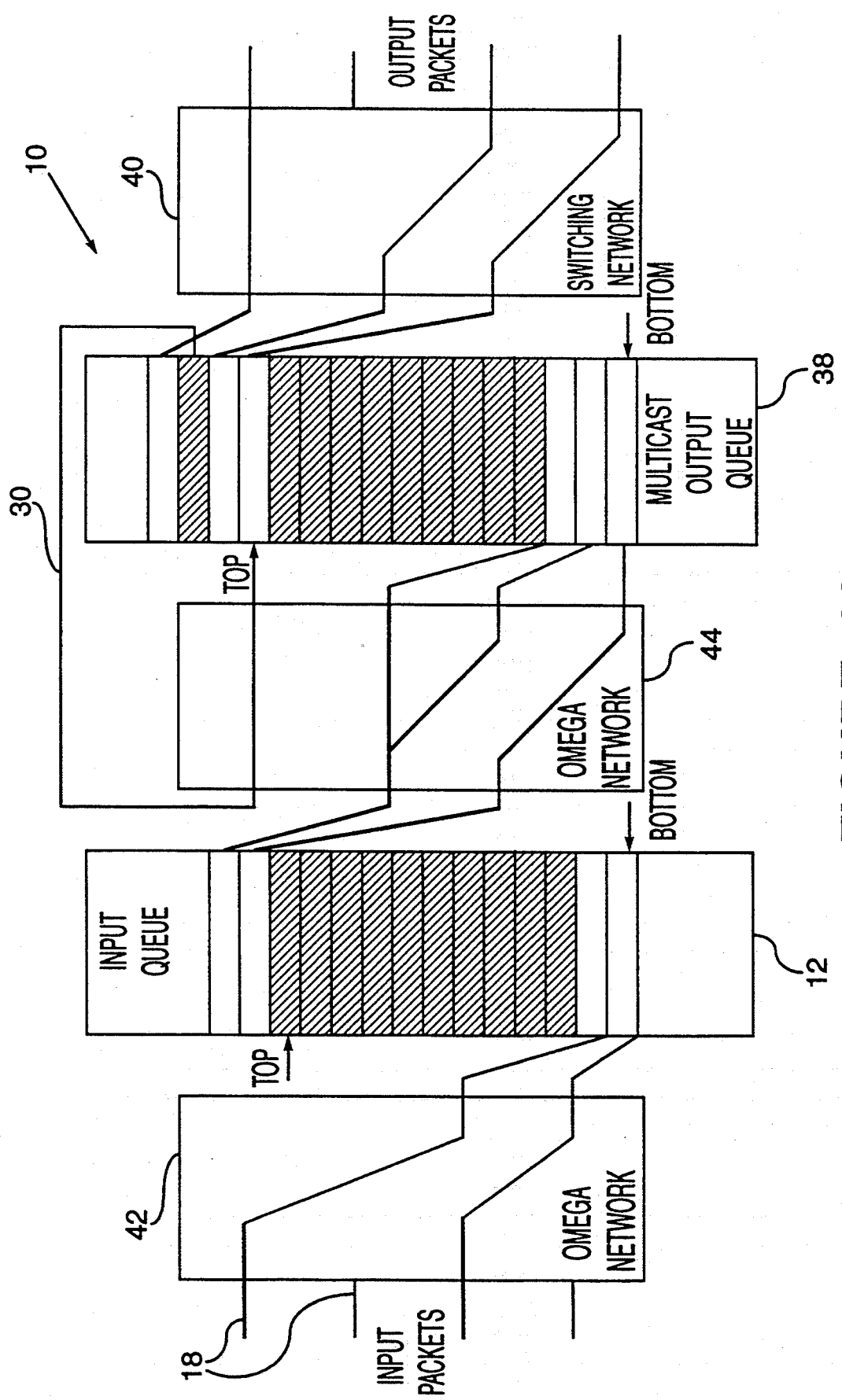
FIG. 11 is a schematic representation of a typical network operation.

Typical network operation is illustrated in FIG. 11. Two packets are placed into the switch 10. Two other packets are multicast from the input queue 12 to three packets in the multicast output queue 38. Three packets are switched out and one is fed-back due to an output contention in the output switching network. In general, the switch operation requires the following four functions:

1. Packet Input
2. Multicast Expansion
3. Packet Output

Packet Input is performed in the first Omega network 42 of the switch 10. Packets arrive at the input ports 18 of the switch and are simultaneously routed to the bottom of the input packet queue 12. These packets can be simultaneously routed with a distributed control by utilizing "combining fetch-and-add" operations in the Omega network and an interleaved shared-memory. This, furthermore, requires non-blocking paths in the Omega network. Thus, there is no blocking in placing input packets into the shared-memory input queue 12. Packets are removed from the top of the input queue to be multicast in the second Omega network 44.

Multicast Expansion is performed in the second Omega network 44 of the switch 10. To multicast packets, each packet in the input queue 12 is replicated to multiple packets in the second Omega network 44 for each output port of the multicast group. For example, if a packet is multicast to three output ports, then that packet requires one location in the input queue 12 and three locations in the multicast output queue 38. As with an input packet algorithm, the algorithm for multicast permits simultaneous operation and is performed under distributed control. The greatest number of packets are removed from the input queue and multicast, such that the number of replicated packets does not exceed the number of outputs ports of the Omega network. The output packets from the second Omega network are then added to the bottom of the multicast output queue.

Packet Output is performed in the last switching network 40 of the switch 10. Each element of the output queue 38 corresponds to a packet destined for a single output port. Packets are removed from the top of the queue to be routed to final output ports. As many packets as possible are removed from the queue, up to the number of input ports of the switching network. The switching network such as a crossbar or the Batcher-Banyan switch transfers packets from the multicast output queue 38 to the output ports. Blocking can occur if two packets are destined to the same output port. If output blocking occurs, the first packet destined for the output port is transferred to that port and all other packets are identified as blocked. Blocked packets are returned to the second Omega network 44 by feedback paths 50 from the multicast output queue 38.

Packet Feedback is performed in the second Omega network 44. Blocked packets from the output switching network 40 are identified and are returned to the second Omega network 44 by feedback paths 30. The blocked packets are simultaneously routed to the top of the multicast output queue 38, to preserve the packet sequence. The algorithm required to perform packet feedback is identical to that required for packet input. Operation of the input, output and feedback networks is identical to that of the non-multicast packet switch. Multicast expansion is performed in the second Omega network 44 of the switch 10. The top elements of the input queue 12 are removed, replicated for each multicast output as needed, and stored in sequential entries at the bottom of the multicast output queue 38. Due to memory interleaving, all input, and output, packets are stored in different and consecutive memory addresses 14. The multicast function is performed by modifying the standard routing procedure performed in the Omega network.

Figure 12:
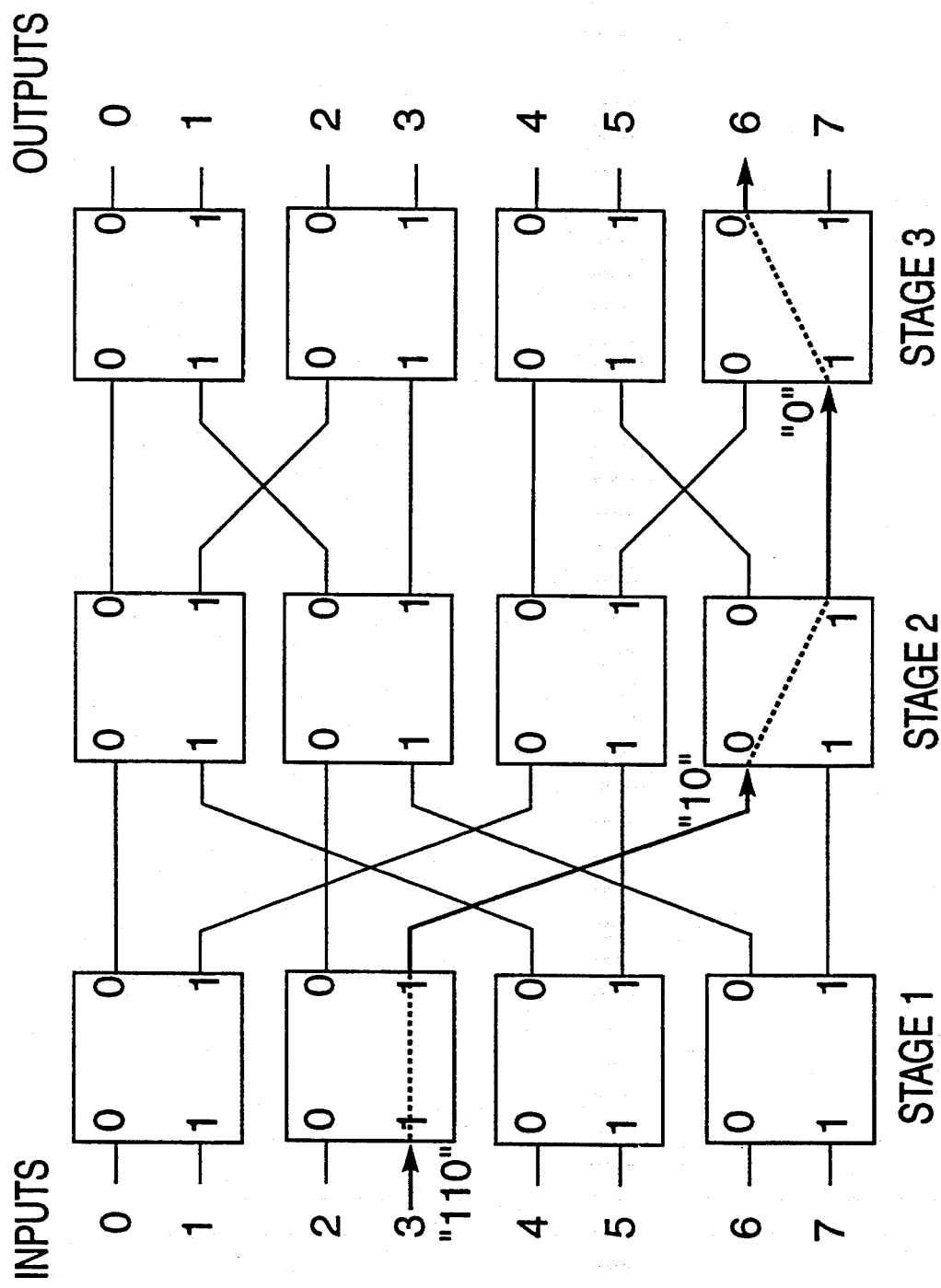
FIG. 12 is a schematic representation of routing in a standard Omega network.

An example of the standard routing procedure utilized in the Omega network is illustrated in FIG. 12. For N inputs and N outputs, addressed from 0 to N-1, the Omega network contains $log_2 N$ stages of $2 \times 2$ switching elements. Routing is accomplished for a packet entering any input by utilizing the desired output address Of the packet. Each stage of the Omega network is responsible for a single bit of the destination address. The output address of the packet is presented to a $2 \times 2$ switching element of the first stage of the Omega network. The most significant bit of the output address is removed and the remaining address is forwarded to the $2 \times 2$ switching element output corresponding to the removed address bit. For example, in FIG. 12 a packet destined for output 6 of the Omega network enters input 3. Address "110" is transferred to the $2 \times 2$ switch connected to input 3. That switch removes the most significant bit, "1" and forwards address "10" to its "1" output. This procedure is repeated by the switching elements in subsequent stages of the Omega network until the packet arrives at its destination. Using this routing scheme, the packet will correctly arrive at output 6 from any input of the Omega network.

To facilitate multicast routing in the switch a single input of the second Omega network 44 can transfer a packet to multiple outputs. In general, multicasting a single input packet to multiple outputs of the Omega network is a difficult problem. The general multicasting problem is simplified in this architecture to that of multicasting consecutive single inputs to multiple consecutive outputs only. The second Omega network 44 transfers entries from the top of the input queue to sequential entries at the bottom of the multicast output queue 38. Due to memory interleaving, sequential entries in the multicast output queue are located in consecutive memory banks and thus consecutive outputs of the Omega network.

The simplified multicast routing problem of multicasting a single input to multiple consecutive outputs is solved with minor enhancements to the Omega network. A multicast input must be transferred to a range of consecutive output addresses. Since the range is consecutive, it can be specified by two numbers, upper and lower, corresponding to the upper and lower addresses of the range, respectively. It is also assumed that lower<upper. In practice, lower can be greater than upper to represent a range that starts at a high address, continues higher, and wraps to a low address. The new routing procedure is similar to the standard Omega network routing procedure, except that instead of manipulating a single output address, the address pair, [lower, upper], must be manipulated. A $2 \times 2$ switching element receives the address pair and removes the most significant bit of each. If the removed bits are the same, the remaining bits of upper and lower are forwarded, as before, to the $2 \times 2$ switching element output corresponding to value of the removed address bits. If the removed bits differ, then the most significant bit of lower is "0" and the most significant bit of upper is "1". In this case, some part of the range of output addresses must be routed to the 2×2 switching element output "0" and the remaining range must be routed to output "1". The packet will be forwarded to both outputs. To facilitate correct routing the address pairs [lower, 11 ... 1] and [00 ... 0, upper] are generated and forwarded to ports "0" and "1" respectively. Using this routing scheme, the packet will be correctly routed to all consecutive output addresses from lower to upper.

Figure 13:
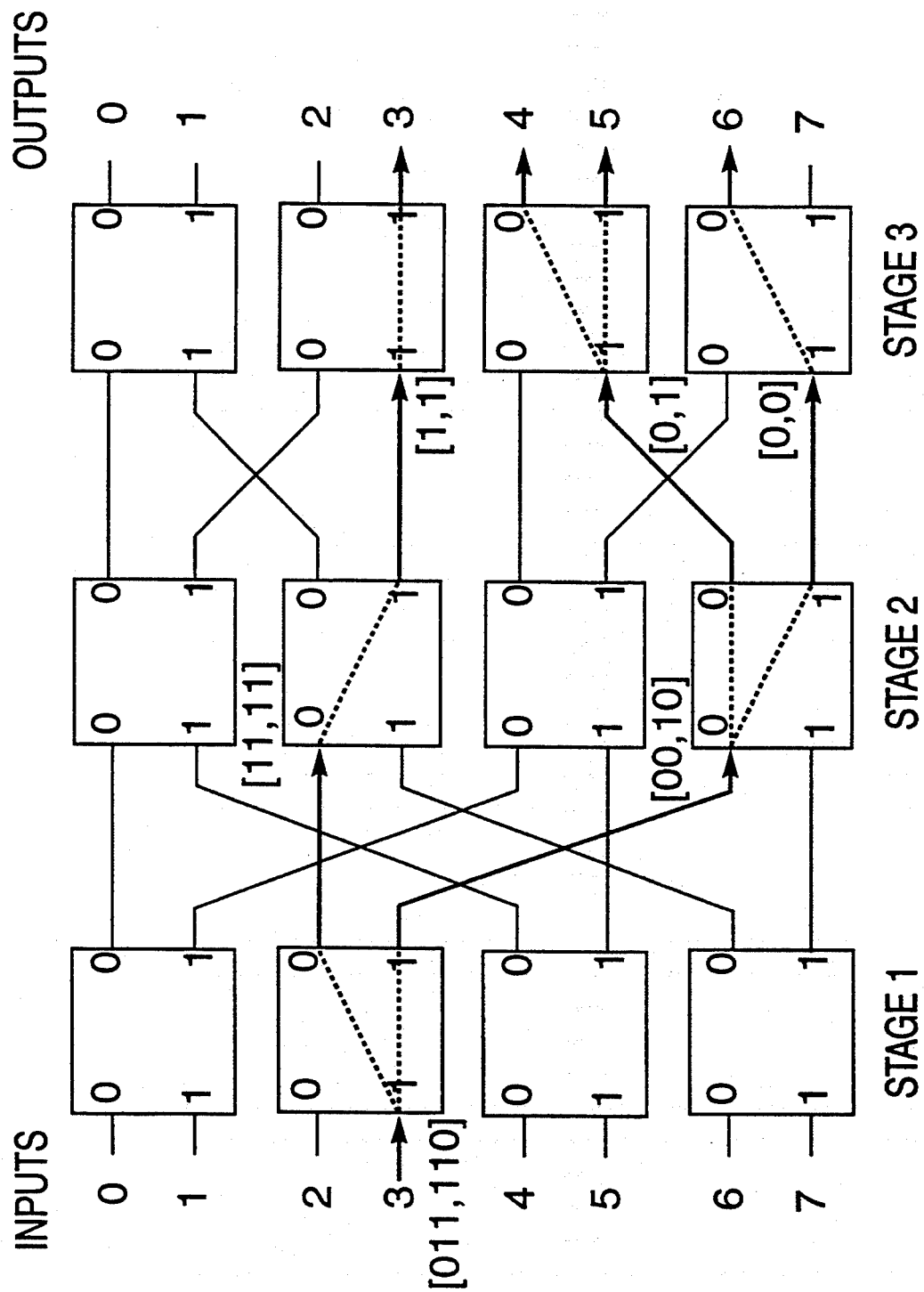
FIG. 13 is a schematic representation of multicast routing in the Omega network.

An example of the multicast routing procedure is illustrated in FIG. 13. A single packet arrives at input 3 to be multicast routed to outputs 3 through 6. The address pair "[011, 110]" is transferred to the 2×2 switch connected to input 3. That switch removes the most significant bits "0" and "1" from upper and lower. Since the most significant bits differ the switching element transfers the incoming packet to both of its outputs. For correct routing the new address pair "[11, 11]" ([lower, 11]) is forwarded to output "0" and "[00, 10]" ([00, upper]) is forwarded to output "1". Examine the second switching element of Stage 2. The element receives the address pair "[11, 11]". Since the most significant bits of the address pair are the same, the remaining address pair, "[1, 1]", is forwarded to its "1" output. At completion of the routing procedure, input 3 is correctly routed to consecutive outputs 3 through 6. This routing procedure can be utilized for standard Omega network routing with a single destination by setting upper=lower.

The presented multicast routing procedure facilitates the routing of a single input of the Omega network to multiple consecutive outputs. Furthermore, the routing procedure permits several consecutive inputs to each be simultaneously routed to multiple consecutive non-wrapping outputs. The paths required for one of the inputs will not block, or interfere with the paths of the other inputs. A similar two phase scheme to that of the feedback network is utilized to permit wrapped outputs.

The throughput can be increased by providing a modified copy number generator to the input queue 12 in the following manner. Rather than dropping the entire packets to be replicated when a multicast packet has more than N packets, up to N packets can be replicated and the copy number of the multicast packet is reduced to the number of packets that cannot be transmitted in the first trial. The scheme to determine which inputs packets can be sent through the second Omega network is simply implemented by observing the address obtained from the fetch-and-add operation and selecting those with the number less than N. Let $c_i$ be the number of copies for the ith packet in the input queue 12 from the top pointer address. The kth packet that satisfies the condition, $$\sum_{i=0}^{i=k-1} c_i \leq N \leq \sum_{i=0}^{i=k} c_i$$

from the fetch-and-add operation can be found. Once the kth packet is found $$N - \sum_{i=0}^{i=k-1} c_i$$

copies of the kth packet will be replicated through the second Omega network and the copy number of the kth packet is changed to $$c_k - \left( N - \sum_{i=0}^{i=k-1} c_i \right).$$

The kth packet with the new copy number remains in the shared-memory input queue to be sent in the next clock cycle. The top pointer indicates the position of the kth packet in the shared-memory input queue.

Figure 14:
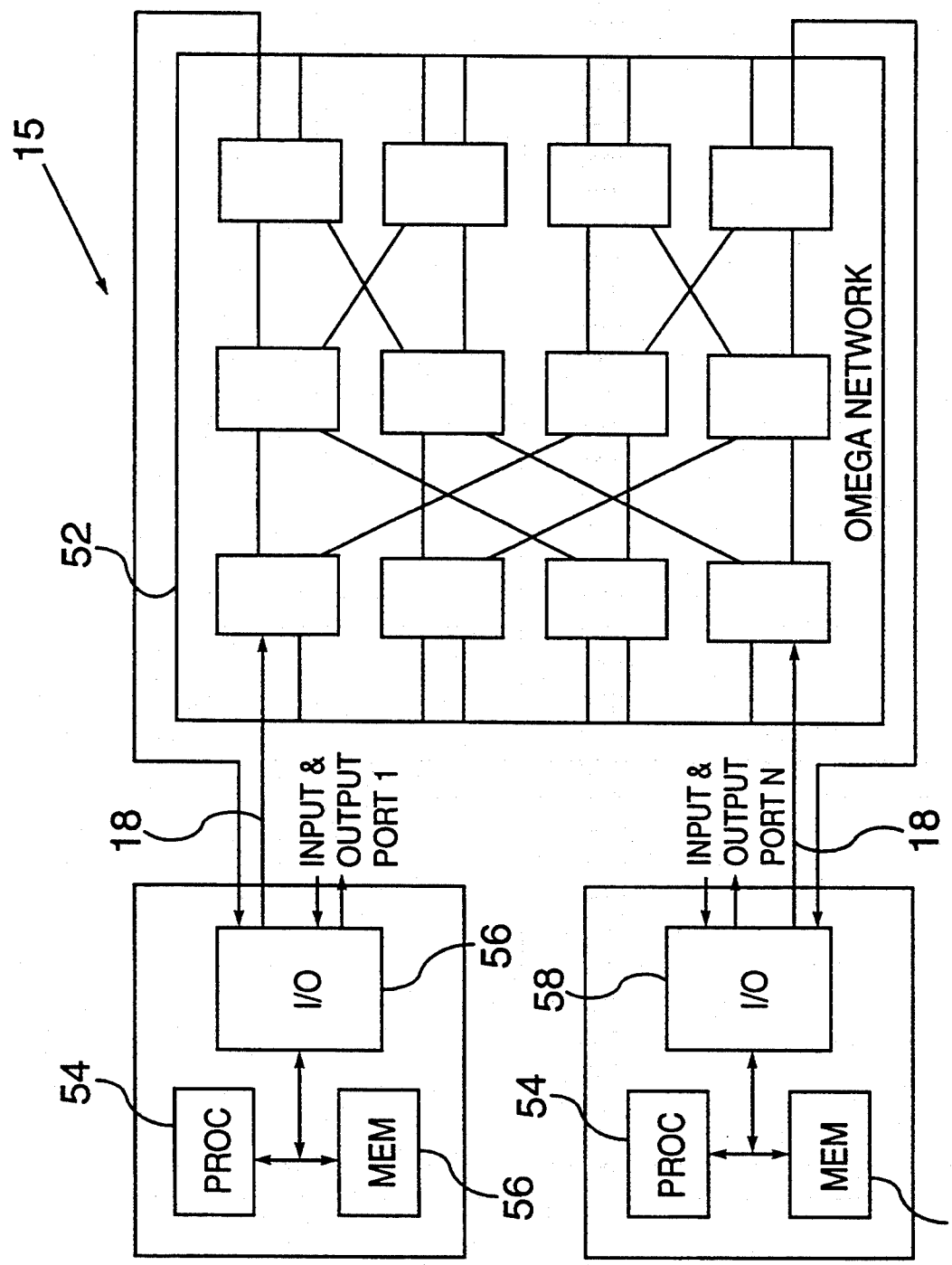
FIG. 14 is a schematic representation of an alternative switch implementation.

A likely implementation of a copy network architecture 15 is illustrated in FIG. 14. The copy network is designed to execute in packet cycles. Packets arrive at the input ports 18 of the switch 11 at a fixed frequency that is determined by the maximum transmission rate. The shortest interarrival time is identified as a switch cycle. The switch 15 must perform all of the above functions within a single cycle. This can be performed with two Omega networks, as identified above, or with a single Omega network 52 that can transfer data at four times the rate of arriving packets. A single, faster Omega network is likely due to its availability.

The switch 15 architecture contains N processors 54, one for each input and output port of the switch. Each processor 54 performs all functions required at each stage of the switching function. All shared memory queues are implemented with the memory 56 local to each processor 54 defining N interleaved banks of global memory. The Omega network 52 must perform the following four functions within a single switch cycle: input packet routing, multicast expansion, blocked packet feedback for the input queue and the multicast output queue. As shown, these functions are controlled in a distributed fashion, by the distributed processors. The input 18 and output ports 24 are implemented via an I/O device 58 that can send and receive packets at the required transmission rate and transfer the packets to the processor memory 56.

A detailed performance analysis of the switch follows. For purposes of example, multicast traffic is modelled using the geometric interarrival distribution and the number of packet copies is described by the geometric distribution. The traffic load to the network is assumed to be uniform such that an incoming packet is equally likely to go to any of the output ports 24.

Let $\rho$ be the offered load and $q(Y_i = Y)$ be the probability that the number of copies required by an incoming packet is y. Let $P(X_i = x)$ be the probability that the number of copies generated is x. Then, $$p(k) = Pr[X_i = k] = \begin{cases} 1 - \rho & k = 0 \\ \rho q(k) & k = 1, 2, \ldots \end{cases}$$

$$P(s) = E[e^{sX_i}] = (1 - \rho) + \rho Q(s)$$

Thus, effective offered load $= \rho E(Y_i)$

If it is assumed that $Y_i$ is distributed according to the truncated geometric distribution with the parameter q, then $$q(k) = Pr[Y_i = k] = \frac{(1-q) q^{k-1}}{1 - q^N} \quad 1 \leq k \leq N$$

where N is the maximum allowable number of copies. Since an incoming packet will multicast to, at most, all the output queues 38, N is the same as the size of the network (i.e. N=64 for 64×64 network).

The average number of copies per incoming packet is then, $$E(Y_i) = \frac{1}{1-q} - \frac{N_q^N}{1-q^N}$$

Figure 15:
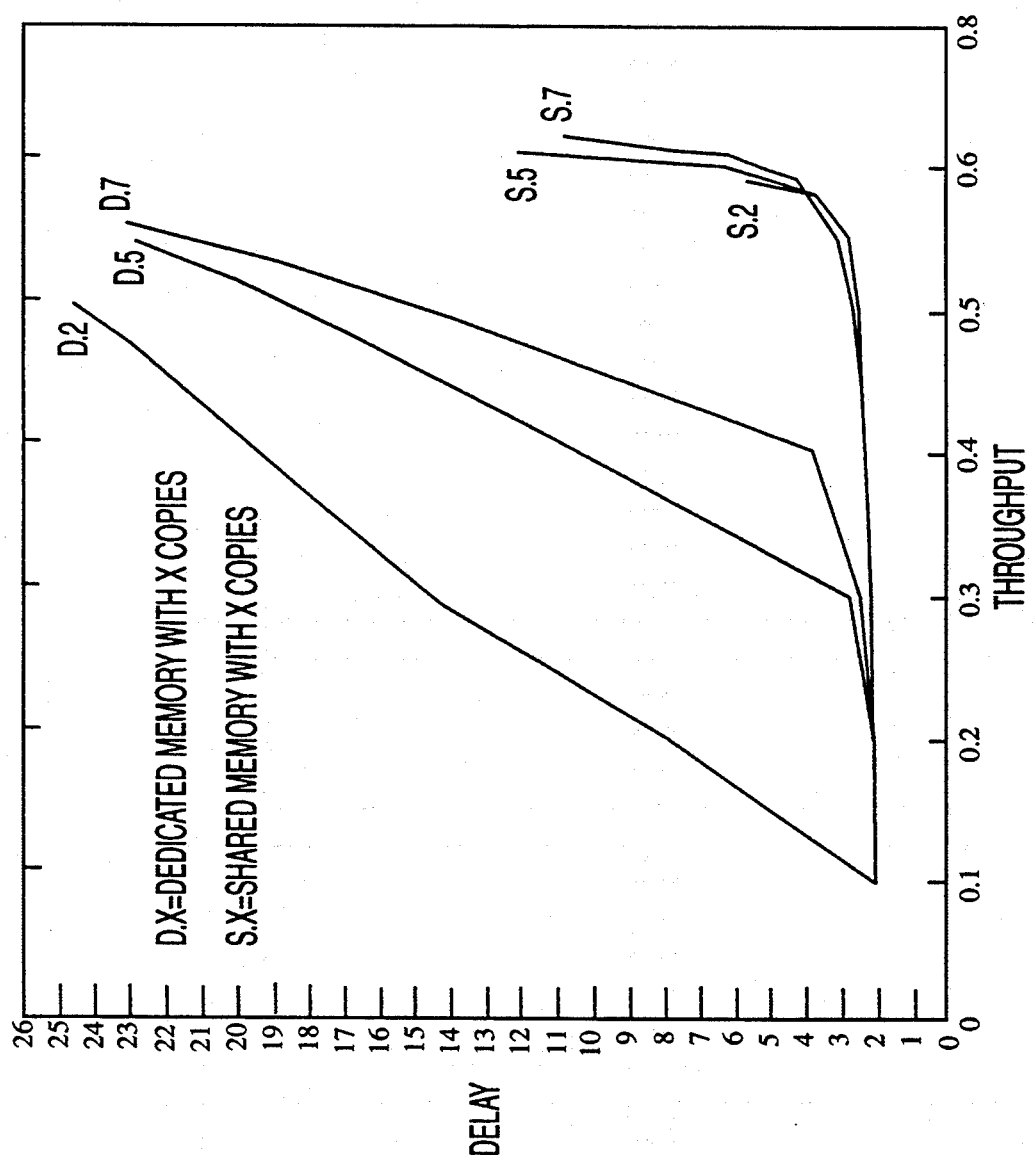
FIG. 15 is a graph of delay versus throughput for multicast traffic with 20 buffers in a dedicated-memory and shared-memory copy networks.

FIG. 15 shows the delay versus the throughput for various average copy numbers for both the shared-memory network indicated by the prefix "s" and the dedicated-memory copy network indicated by the prefix "d". To operate the copy network with reasonable packet delay, the offered load is reduced to 0.1, 0.3 and 0.4 from 0.586 (the maximum throughput of the input queuing switch 12) for the multicast traffic with the average copy number of 2, 5 and 7, respectively. This is a significant reduction from the maximum throughput of 0.58 for point-to-point traffic. However when the buffers are shared, the maximum throughput can be maintained at the same level as that of point-to-point traffic as shown in the figure. Furthermore, the delay remains close to minimum up to the saturation point. Traffic with larger number of copies has lower delay and higher throughput. Since the offered load remains constant, as the number of copies increases, the arrival rate of the multicast traffic is reduced and thus, throughput increases and delay decreases.

Figure 16:
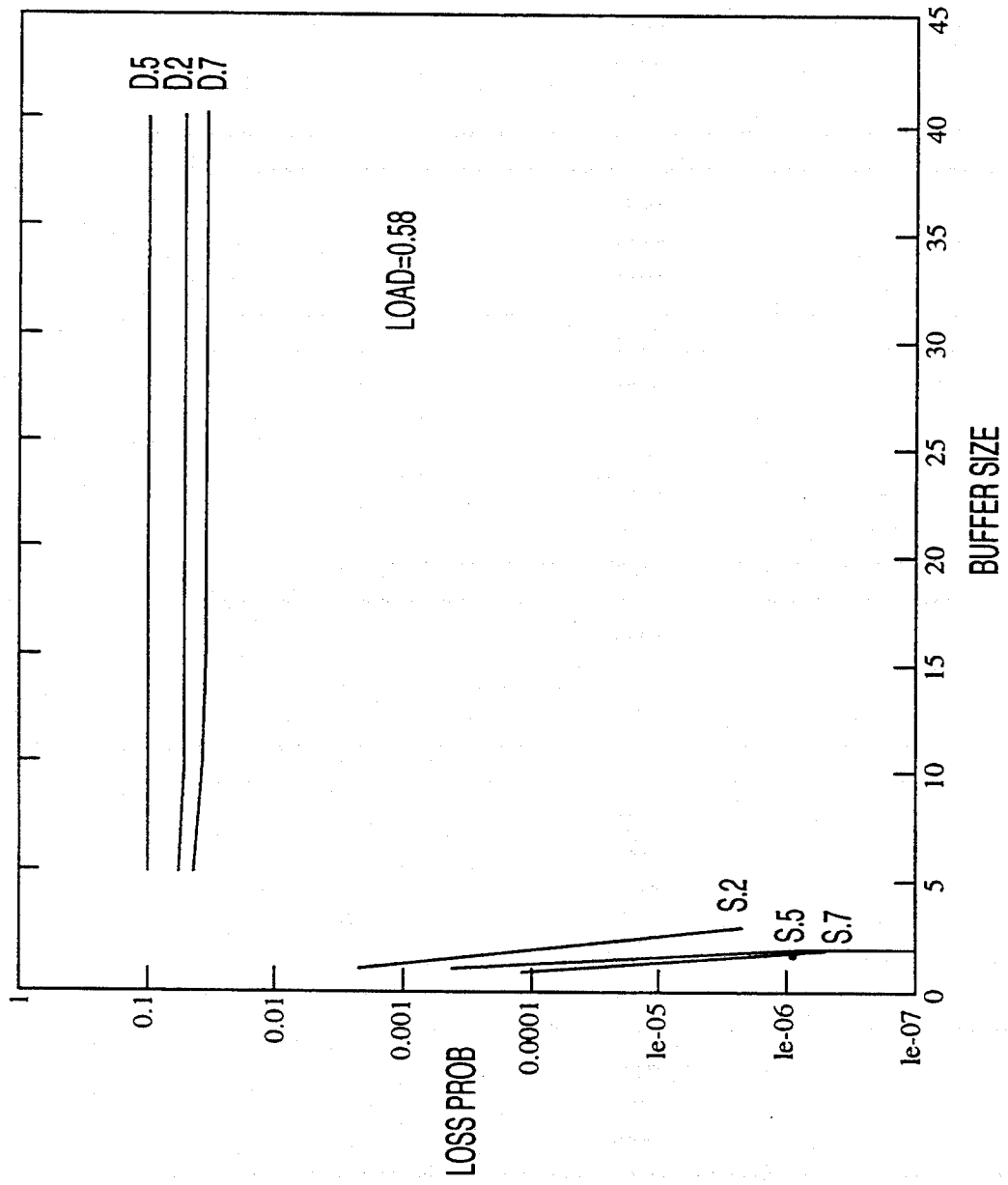
FIG. 16 is a graph of packet loss probability versus buffer size for the dedicated-memory and the shared-memory copy networks with input load of 58%.

FIG. 16 shows the packet loss probability versus the buffer size for the dedicated-memory and the shared-memory copy networks 15, 11. The packet loss probability is obtained when the load is 0.58, close to the maximum throughput of the point-to-point traffics. As expected, the shared-memory network 11 requires order of magnitude fewer buffers than that of the dedicated-memory copy network 15. For instance, the shared memory needs only less than 5 buffers to maintain the packet loss probability of $10^{-6}$ whereas the dedicated-memory copy network would require several orders of magnitude of buffers to close the gap between the two.

Figure 17:
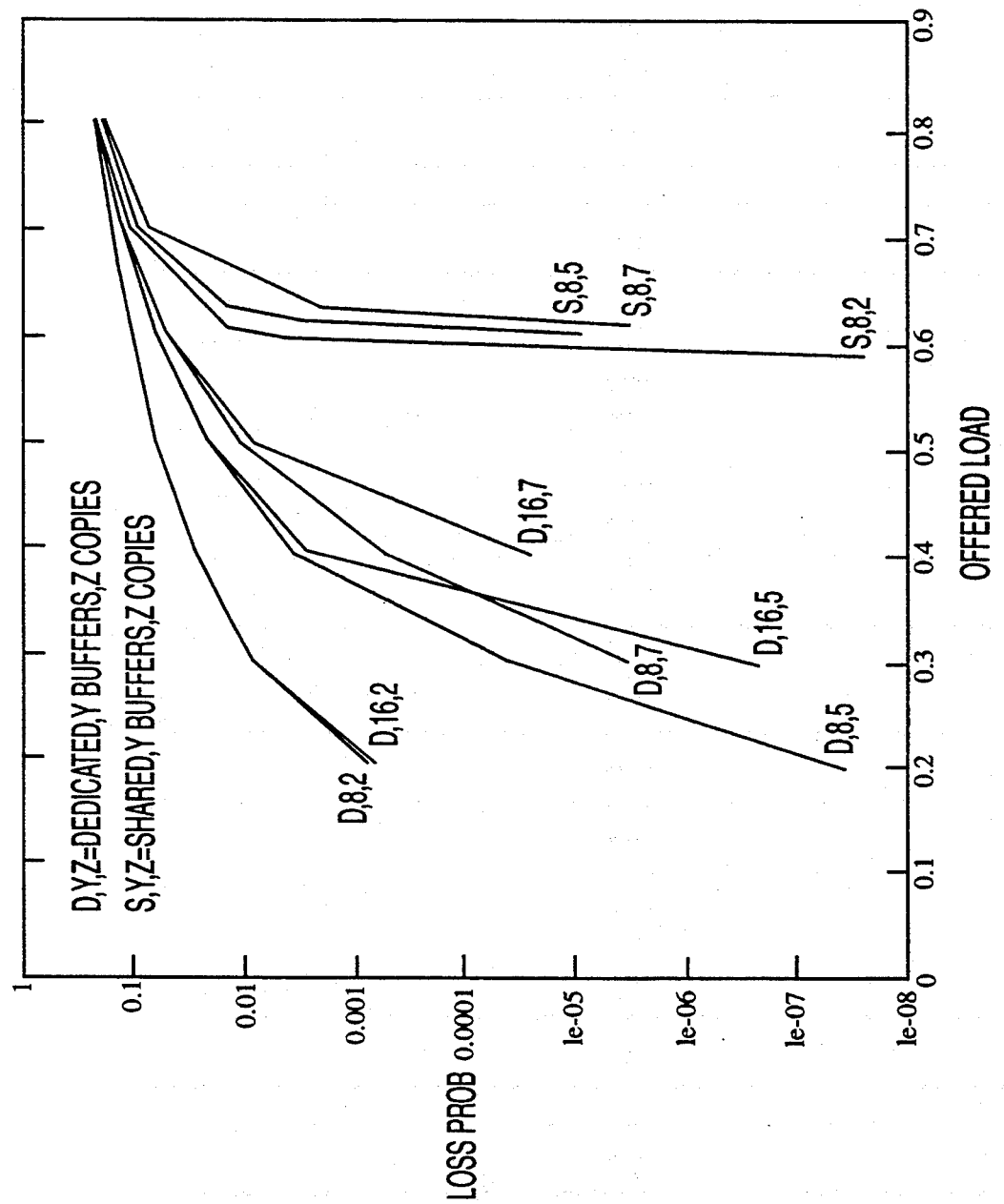
FIG. 17 is a graph of packet loss probability versus offered load for the dedicated-memory and the shared-memory copy networks.

FIG. 17 shows the packet loss probability versus the offered load for the dedicated-memory and the shared-memory copy networks with the buffer size of 8 and 16. The shared-memory copy network could operate with a load up to 0.6 with a very low packet loss probability (i.e. $10^{-7}$). However, the dedicated-memory copy network could only handle a low load (i.e. 0.2–0.3) if the same packet loss probability is required. Thus, when the same packet loss probability is required the shared-memory copy network has significantly higher throughput than the dedicated-memory copy network.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A packet switch comprising:
    a shared memory queue having M interleaved storage banks having addresses at which respective packets are stored, where M is an integer >3;
    a presentation network having N input ports for receiving packets and providing the respective packets to desired addresses in the shared memory queue, where N is an integer, the shared memory queue in communication with the presentation network for receiving the packets;
    a distribution network having J output ports, for receiving packets from the shared memory queue and providing them to the desired output ports, the distribution network in communication with the shared memory queue;
    means for simultaneously generating addresses for packets received by the presentation network such that packets received on ordered input ports by the presentation network are caused to be provided by the presentation network to consecutively ordered addresses in the shared memory queue; and
    feedback means having F≧0 feedback channels in communication with the shared memory and the presentation network for restoring packets blocked from the distribution network.

2. A switch as described in claim 1 whereby M=N.

3. A switch as described in claim 2 wherein M=N=J.

4. A packet switch comprising:
    an N input port x N output port switching network, where N>3 and is an integer;
    N I/O devices, with each I/O device connected to a corresponding input port and a corresponding output port;
    N processors, each processor connected to a correspondence I/O device;
    a shared input memory comprising N interleaved memory banks, each memory bank connected to a corresponding processor and corresponding I/O device; and
    a means for simultaneously generating addresses for packets received on the input ports such that packets received on ordered input ports are caused to be provided to consecutively ordered addresses of the shared input memory.

5. An N port memory, where N>3, comprising:
    a global shared memory queue having M interleaved storage banks having addresses in which respective packets are stored, where M>3 and is an integer;
    a presentation network having N input ports for receiving packets and providing the respective packets to desired addresses in the shared memory queue, where N≧3 and is an integer, the shared memory queue in communication with the presentation network for receiving the packets; and
    means for simultaneously generating addresses for packets received by the presentation network such that packets received on ordered input ports by the presentation network are caused to be provided by the presentation network to consecutively ordered addresses in the shared memory queue.

6. An architecture for switching packets comprising:
A. an input queue for storing received packets at ordered addresses of a shared memory, comprising:
    i. N≧3 input ports for receiving packets,
    ii. means for simultaneously generating unique sequentially ordered addresses for each of the received packets,
    iii. a shared memory having K interleaved banks for consecutively storing addressed packets,
    iv. a switching network for connecting the input ports to the shared memory;

B. an output switching network for transmitting packets to their specified output port comprising:
  i. M≧3 output ports for transmitting packets,
  ii. a switching network for connecting the output of the shared memory to the output ports,
  iii. means for directing a packet from the shared memory to its proper output port; and
C. a feedback network for restoring at sequential addresses in the shared memory of the input queue packets blocked from the output switching network, comprising:
  i. F>0 feedback channels,
  ii. a switching network for connecting the output of the shared memory and said input,
  iii. means for simultaneously generating unique sequentially ordered addresses for each of the feedback packets, such that no null spaces exist between consecutively stored packets, where N, K, M, and F are integers.

7. The architecture as set forth in claim 6 wherein K≧N.

8. The architecture as set forth in claim 6 wherein M≧N.

9. The architecture as set forth in claim 6 wherein F≦N.

10. The N port memory of claim 5 further comprising a distribution Network having N input ports for receiving packets from consecutively ordered addresses in the shared memory queue, and providing the packets to desired output ports, the shared memory queue being in communication with the distribution network for receiving the packets.

11. An architecture for switching packets comprising:
A. an input queue for storing received packets at ordered addresses of a shared memory, comprising:
  i. N≧3 input ports for receiving packets,
  ii. means for generating unique sequentially ordered addresses for each of said received packets,
  iii. a shared memory having K interleaved banks for consecutively storing addressed packets,
  iv. a switching network for connecting said input ports to said shared memory, said switching network for connecting said input ports to said shared memory being an omega network;
B. an output switching network for transmitting packets to their specified output port comprising:
  M≧3 output ports for transmitting packets,
  ii. a switching network for connecting the output of said shared memory to said output ports, said switching network for connecting the output of said shared memory to said output ports being an omega network,
  iii. means for directing a packet from said shared memory to its proper output port; and
C. a feedback network for restoring at sequential addresses in said shared memory of said input queue packets blocked from said output switching network, comprising:
  i. F≧0 feedback channels,
  ii. a switching network for connecting said output of said shared memory and said input, said switching network for connecting said output of said shared memory and said input being an omega network,
  iii. means for generating unique sequentially ordered addresses for each of the feedback packets, such that no null spaces exist between consecutively stored packets, where N, K, M, and F are integers.

12. An architecture for switching packets comprising:
A. an input queue for storing received packets at ordered addresses of a shared memory, said input queue being a first-in, first-out queue, said input queue comprising:
  i. N≧3 input ports for receiving packets,
  ii. means for generating unique sequentially ordered addresses for each of said received packets,
  iii. a shared memory having K interleaved banks for consecutively storing addressed packets,
  iv. a switching network for connecting said input ports to said shared memory;
B. an output switching network for transmitting packets to their specified output port comprising:
  i. M≧3 output ports for transmitting packets,
  ii. a switching network for connecting the output of said shared memory to said output ports,
  iii. means for directing a packet from said shared memory to its proper output port; and
C. a feedback network for restoring at sequential addresses in said shared memory of said input queue packets blocked from said output switching network, comprising:
  i. F≧0 feedback channels,
  ii. a switching network for connecting said output of said shared memory and said input,
  iii. means for generating unique sequentially ordered addresses for each of the feedback packets, such that no null spaces exist between consecutively stored packets,
where N, K, M, and F are integers.

13. An architecture for switching packets comprising:
A. an input queue for storing received packets at ordered addresses of a shared memory, comprising:
  i. N≧3 input ports for receiving packets,
  ii. means for generating unique sequentially ordered addresses for each of said received packets, said means for generating unique sequentially ordered addresses for each received packet comprising a combining fetch-and-add circuit
  iii. a shared memory having K interleaved banks for consecutively storing addressed packets,
  iv. a switching network for connecting said input ports to said shared memory;
B. an output switching network for transmitting packets to their specified output port comprising:
  i. M≧3 output ports for transmitting packets,
  ii. a switching network for connecting the output of said shared memory to said output ports,
  iii. means for directing a packet from said shared memory to its proper output port; and
C. a feedback network for restoring at sequential addresses in said shared memory of said input queue packets blocked from said output switching network, comprising:
  i. F≧0 feedback channels,
  ii. a switching network for connecting said output of said shared memory and said input,
  iii. means for simultaneously generating unique sequentially ordered addresses for each of the feedback packets, such that no null spaces exist between consecutively stored packets,
where N, K, M, and F are integers.

14. An N port memory, where N≧3, comprising:

a global shared memory queue having M interleaved storage banks having addresses in which respective packets are stored, wherein $M \geq 3$ and is an integer, and wherein the shared memory queue is a first-in, first-out queue;

a presentation network having N input ports for receiving packets and providing the respective packets to desired addresses in the shared memory queue, where $N > 3$ and is an integer, the shared memory queue in communication with the presentation network for receiving the packets; and means for generating addresses for packets received by the presentation network such that packets received on ordered input ports by the presentation network are caused to be provided by the presentation network to consecutively ordered addresses in the shared memory queue.

15. The N port memory of claim 5 wherein the global shared memory queue is a first-in, first-out queue.

* * * * *